(12) United States Patent
Adinolfe

(10) Patent No.: US 7,299,517 B1
(45) Date of Patent: Nov. 27, 2007

(54) LOADING PAD

(76) Inventor: Nancy Adinolfe, 4077 Vega Loop, Shingle Springs, CA (US) 95682

( * ) Notice: Subject to any disclaimer, the term of this patent is extended or adjusted under 35 U.S.C. 154(b) by 0 days.

(21) Appl. No.: 11/405,117

(22) Filed: Apr. 17, 2006

(51) Int. Cl.
*E01D 1/00* (2006.01)
*B65G 11/00* (2006.01)

(52) U.S. Cl. .......................................... 14/69.5; 193/38
(58) Field of Classification Search .............. 14/69.5; 193/38
See application file for complete search history.

(56) References Cited

U.S. PATENT DOCUMENTS

| | | | |
|---|---|---|---|
| 2,141,529 A * | 12/1938 | Gravelle ...................... | 14/69.5 |
| 4,084,713 A * | 4/1978 | Rohrs et al. ................. | 414/537 |
| 4,528,711 A * | 7/1985 | Packer ........................ | 14/69.5 |
| 4,668,002 A * | 5/1987 | Hanson ........................ | 296/61 |
| 4,779,298 A * | 10/1988 | Nichols et al. .............. | 14/69.5 |
| D331,305 S | 11/1992 | Woodward et al. | |
| D348,552 S | 7/1994 | Woodward et al. | |
| 5,325,558 A * | 7/1994 | Labreche .................... | 14/69.5 |
| 5,440,773 A * | 8/1995 | Lentini ....................... | 14/69.5 |
| 6,009,587 A * | 1/2000 | Beeman ...................... | 14/69.5 |
| 6,139,249 A * | 10/2000 | Lucht .......................... | 414/537 |
| 6,430,769 B1 * | 8/2002 | Allen .......................... | 14/69.5 |
| 6,715,177 B1 * | 4/2004 | Lagergren-Julander ..... | 14/69.5 |
| 6,725,487 B2 * | 4/2004 | Myrick et al. ............... | 14/69.5 |
| 2004/0083562 A1 * | 5/2004 | Leblanc ...................... | 14/69.5 |
| 2005/0055783 A1 * | 3/2005 | Peschmann ................. | 14/69.5 |

* cited by examiner

*Primary Examiner*—Raymond W Addie
(74) *Attorney, Agent, or Firm*—Mark C Jacobs

(57) ABSTRACT

An apparatus for loading bikes and motorcycles from the ground to a higher elevation such as into a transport vehicle without lifting. The apparatus permits the user to walk the bike or motorcycle into up a vehicle on a foldable, for easy storage, arcuate ramp. The user holds onto the bike or motorcycle and walks up the ramp from behind the cycle in a first embodiment; or adjacent to the vehicle into the van or truck in a second embodiment. The second embodiment includes a series of spaced steps or U-rungs on one or both sides of the ramp. Both versions fold for easy storage and portability and both embodiments can be separated into two parts for easy linear storage if needed.

20 Claims, 4 Drawing Sheets

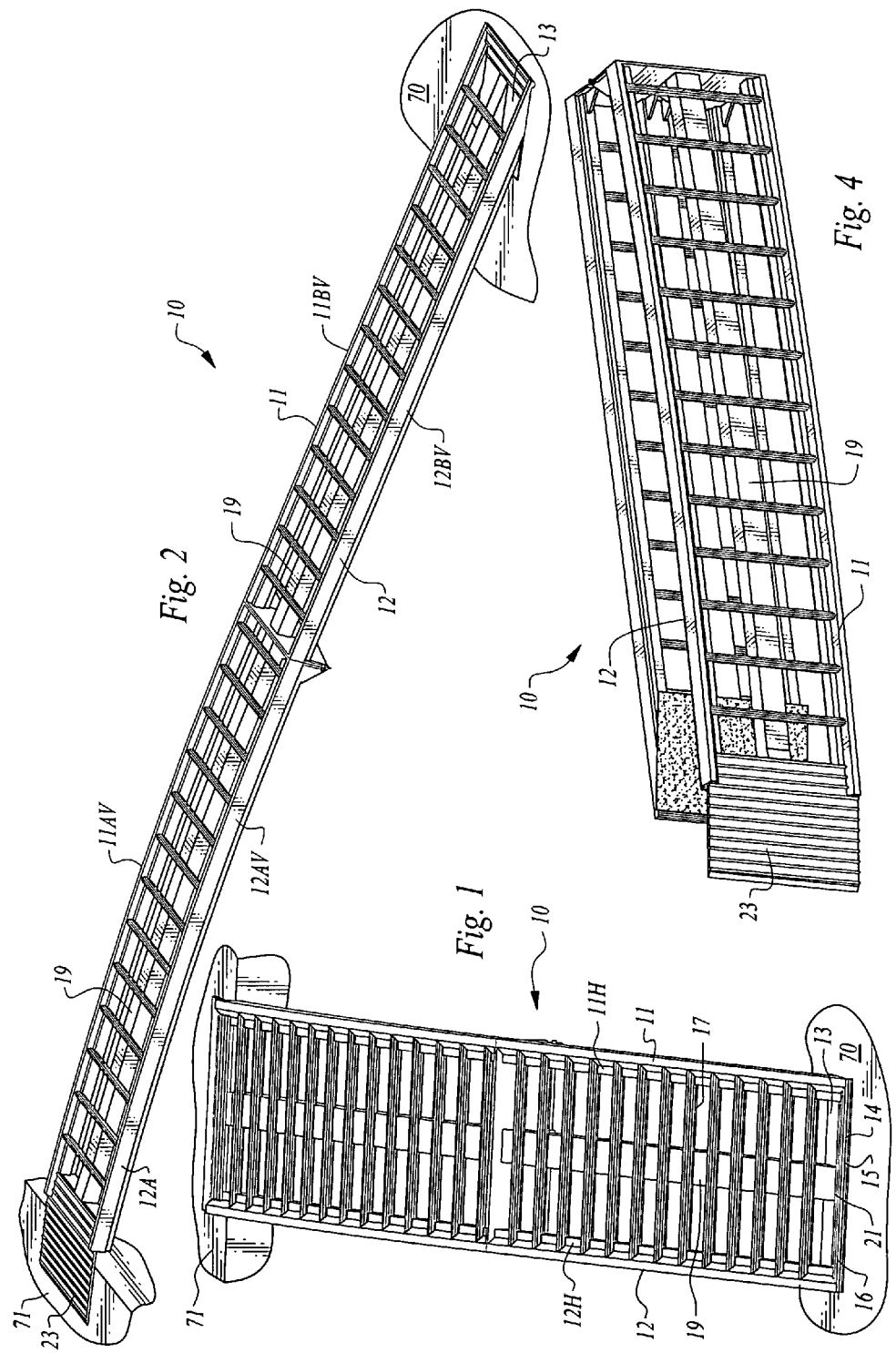

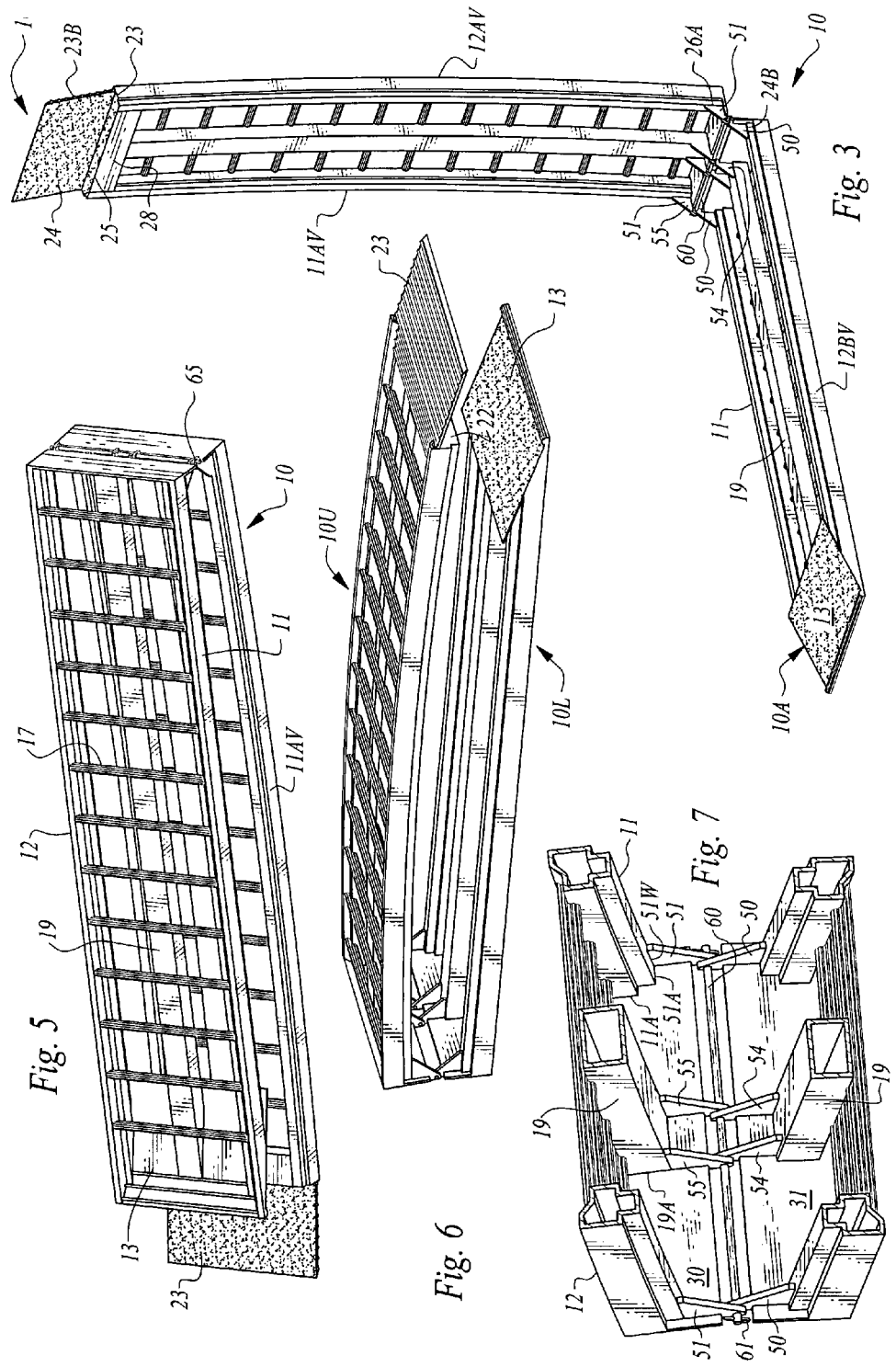

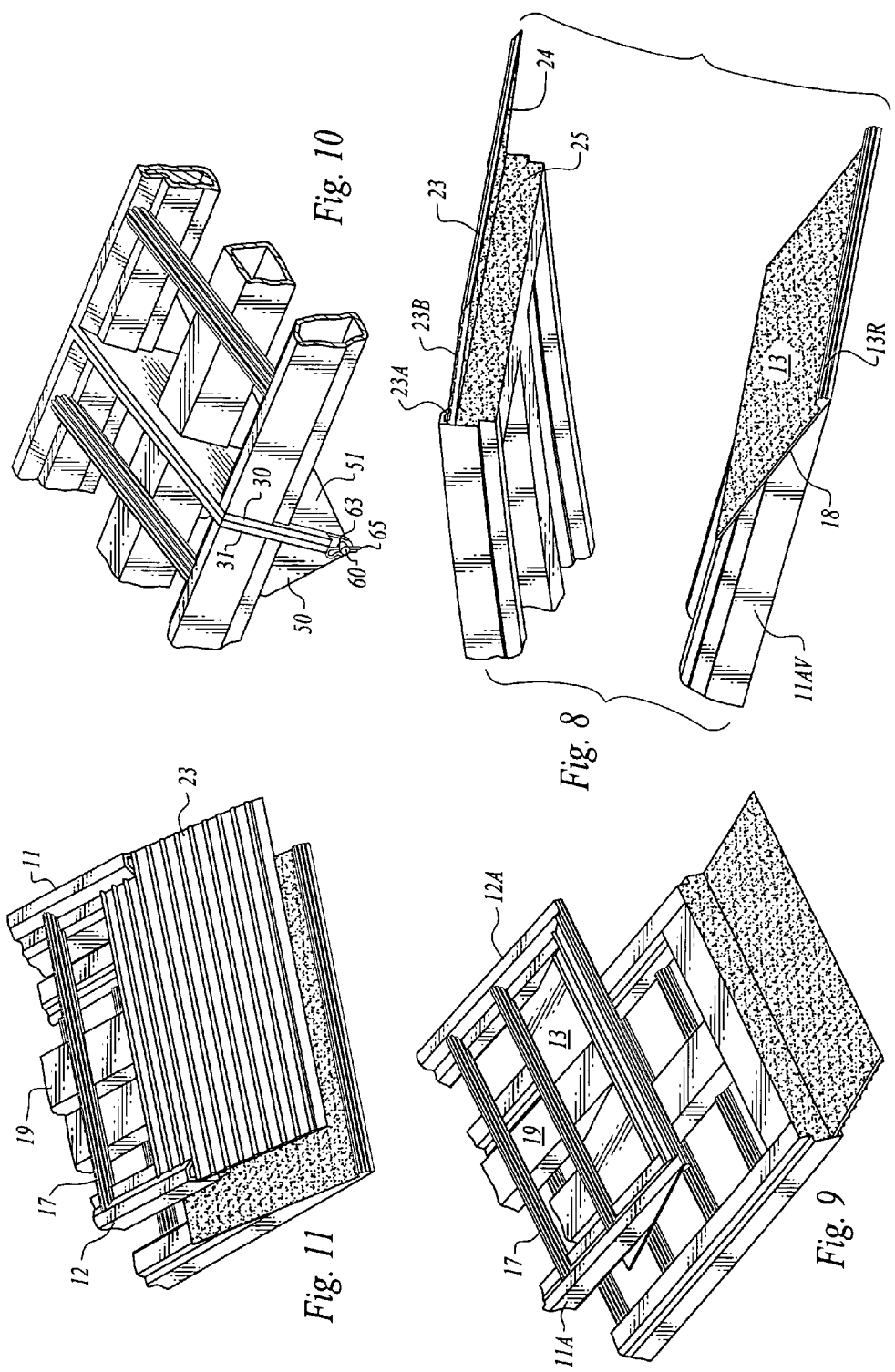

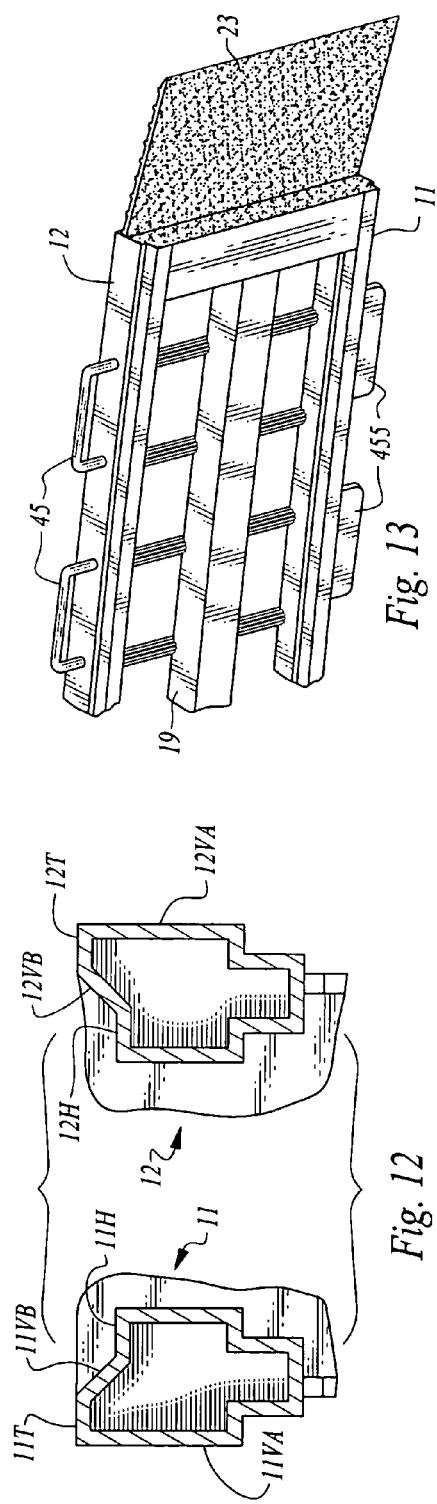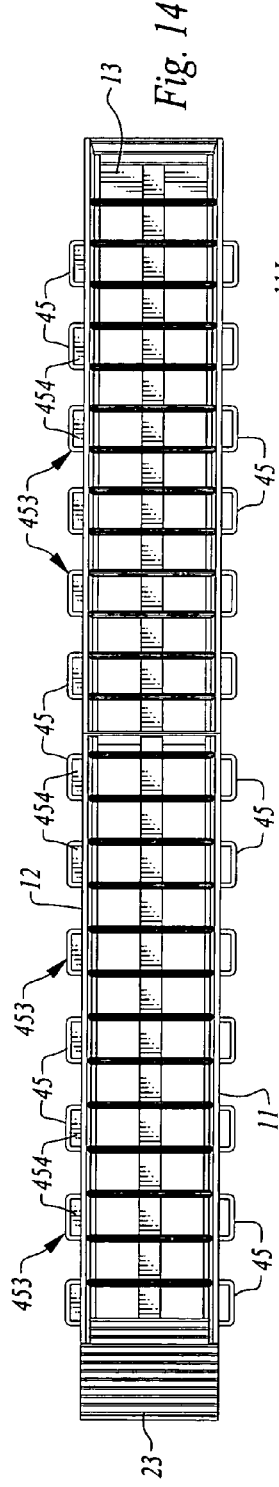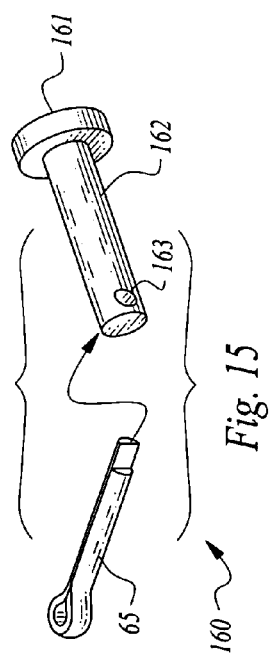

LOADING PAD

KNOWN PRIOR ART

Applicant is aware of former U.S. Design Patent 331,305. Said patent having been held invalid and U.S. Design Patent 348,552, having a partial similar inventorship, the validity of which is believed doubtful due to closeness of subject matter. No prior art search has been carried out however.

FIELD OF THE INVENTION

This application pertains to an apparatus to be used for moving a cycle from a lower elevation to a higher elevation, such as from the ground into a minivan, pickup or other transport vehicle for the loading of bicycles and motorcycles thereon.

BACKGROUND OF THE INVENTION

The loading of motorcycles and bicycles into a minivan or a pickup truck when done without any type of loading device requires the person to lift anywhere from twelve to forty pounds, for a bicycle and up to 1,500 for a motorcycle. The higher the price, the lighter the weight of the bicycle, the more equipped the motorcycle, the heavier it is. Often two people do the work, to made sure the expensive bike does not fall over on its side, once placed in the vehicle. These lightweight bikes can cost anywhere from $750 to $3000, so care is needed in loading them. Motorcycles can cost into the multi-thousands of dollars.

When loading a motorcycle, if it is to be manually loaded without any use of type of inclined plane, it would be necessary to raise the front wheel into the vehicle, have someone hold the front of the cycle and then lift the back end into the vehicle, while the front is being returned upright. This can be detrimental to one's physical health.

Sometimes an inclined plane can be used but extreme care must be used to make sure a rider doesn't drive off the plane while trying to drive into the vehicle or transport system.

If one tries to straddle and walk a motorcycle up a ramp, a great deal of difficulty is encountered, as these marrow ramps usually used for loading cars onto trailers do not afford adequate space to walk as they are not intended for that purpose.

Thus there is a need for an apparatus to aid in the loading of bikes and motorcycles, including choppers, into trucks and minivans. But the question arises, assuming a person was to find such a thing, how do you store it at home? Thus, the instant invention of this application was conceived.

It was conceived because the inventor found that there was indeed a need for an apparatus that would assist a single person to load a bike or motorcycle into a minivan or truck, unassisted, safely and easily, and then store away the assistant apparatus.

The invention accordingly comprises the device possessing the features, properties, the selection of components which are amplified in the following detailed disclosure, and the scope of the application of which will be indicated in the appended claims.

The apparatuses of this invention can be made of aluminum, steel, and other materials or composites thereof, which are capable of supporting the heavy physical loads at any point in time. A combination of fibreglass side rails and aluminum rungs and center support is also contemplated. For the second embodiment, either aluminum or fibreglass steps can be employed to reduce weight, while the side rails are made of aluminum or other suitable material. As to sizing of the apparatus of this invention for the first embodiment, it is believed that a width in the range of fourteen to eighteen inches and a linear length up to, but not limited to 16 feet, will provide easy access to the higher elevation. For the second embodiment with the U-rungs, which are used for support of the walker they should be spaced at about four to six inches apart. For the second embodiment, a total width of about 36 inches is contemplated. This permits a step of about eight to ten inches on each side of a 16-inch main body section.

While the discussion about has all centered on use of this apparatus for the loading of bicycles and motorcycles into a truck or van, if properly sized laterally all terrain vehicles [ATV] can also be loaded into a transport system.

For a fuller understanding of the nature and objects of the invention, reference should be made to the following detailed description, taken in conjunction with the accompanying drawings.

BRIEF SUMMARY OF THE INVENTION

This invention relates to an apparatus for loading bikes and motorcycles into the back of a van or truck by permitting the user to safely walk the bike or motorcycle up an inclined plane into a vehicle. The user merely holds onto the bike or motorcycle and walks or rides up the ramp of this invention into the van or truck, etc., or along side the cycle on a series of U-rungs or steps.

It is an object of this invention to provide an easily storable ramp for loading two-wheeled vehicles.

It is a second object to provide a portable apparatus for loading bikes and/or motorcycles into a van or truck or other carriage vehicle by walking up a ramp while holding onto the two wheeled vehicle.

It is a third object to provide a heavy-duty yet portable ramp for loading and unloading two-wheeled vehicles.

It is a fourth object to provide a folding ramp having adjacent walking rungs for a user to ascend the ramp adjacent his/her two wheeled vehicle.

It is a fifth object to provide a walking ramp that folds down the middle for easy storage.

It is a sixth object to provide a ramp which can be separated into two sections for separate storage or for use in special situations.

These and other objects of the invention will in part be obvious and will in part appear hereinafter.

BRIEF DESCRIPTION OF FIGURES

FIG. 1 is a top perspective view of the first embodiment of the apparatus of this invention.

FIG. 2 is a right side top perspective view of this apparatus's first embodiment.

FIG. 3 is a left side view partially perspective of the first embodiment partially folded.

FIG. 4 is a left top perspective view of this first embodiment fully folded.

FIG. 5 is a bottom perspective view of this apparatus folded over.

FIG. 6 is a left side view of this first embodiment of the apparatus.

FIG. 7 is a close-up bottom view of the hinge area of this apparatus.

FIG. 8 is a right side close-up of the two ends of this apparatus.

FIG. 9 is a bottom perspective view of the two ends.

FIG. 10 is a close-up right side view of the hinge area of this apparatus as found in both embodiments.

FIG. 11 is a close-up view of the top landing platform of the apparatus of this invention.

FIG. 12 is a front elevational view of the general configuration of this apparatus's first embodiment side rails.

FIG. 13 is a partial side elevational view of the right side of the second embodiment, the left side being a mirror image thereof.

FIG. 14 is a top plan view of two variants of the second embodiment.

FIG. 15 is a plan view of the alternate pin that can be used to connect the two sections of both embodiments of this invention.

FIG. 16 is a front composite view of the profile of one component of this invention, compared with prior known components.

DESCRIPTION OF THE PREFERRED EMBODIMENT

Reference should now be made to FIG. 1, wherein the first embodiment of this apparatus is seen. The apparatus 10 is formed of two interconnected portions, a distal portion and a proximal portion each portion includes a pair of spaced parallel pair of arcuate mirror images somewhat L-shaped extended rails 11 and 12. These rails have two vertical components 11VA, 12T, 12VA, and 12VF respectively that are parallel to each other and a horizontal components 11T, 11H, 12T, and 12H, that are parallel to each other. As seen in FIG. 2, these side rails are each interrupted by a gap at the junction of the two segments forming the side rails, which junction takes place at the hinge. Each of the two segments of the two side rails is of equal extension as can be seen in FIG. 4.

The interconnected termini of the two respective portions of side rails 11 and 12 are different however. In FIG. 1, the lower terminus is a generally flat plate 13 having an outer edge 14 that includes a series of transverse alternating grooves 15 and ridges 16. As shown the horizontal components 12H and 11H extend up to and do not overlay the grooved end 14, while the vertical components 11V and 12V close off the grooved end 14. See also FIG. 9.

Evenly spaced between the two side rails is a center support, which may be bar stock or square tubular. The center support 19 rests at its first end of the lower end plate 13. The center support as with the side rails exists in two segments aligned and separated by a slight space at the pivot point of the apparatus. The first segment terminates at a junction on the upper surface of intermediate plate 26A to which it is welded, bolted or otherwise secured. See FIG. 4.

In the extended position, as per FIG. 2, intermediate plate is disposed generally vertically. The termini of the first segment of each of the two side rails terminate at the intermediate plate spaced evenly on opposite sides of the intermediate support. See FIG. 3. Reference is also made to FIG. 7, a close-up view, more of about which will be discussed infra.

Disposed between each of the two vertical components of side rails 11 and 12 is a series of parallel spaced rungs which may be round or square in configuration. Here round rungs are seen, designated 17. Each of these rungs 17 is welded or otherwise attached to the upper surface of the center support 19 and to the horizontal component of each of the side rails.

While more detail will be recited infra, it is to be understood that the second segment of the two side rails and the second segment of the center support are generally the same as their first segment counterparts. See FIGS. 1 and 2.

As can be seen from FIG. 2, the flat plate 13 is disposed at about a 15-degree angle to the side rails. This permits the grooved plate to lie flat on the ground or street during the loading process.

As can be seen in this figure, each of the side rails has a gusset, which may be triangular or some other suitable shape, disposed at the internal end of each of the two segments of the side rails. Thus for the first segment the gussets are disposed at the distal end and for the second segment of each side rail, at the proximal end.

The reader is now referred to FIGS. 3 & 7 for the details concerning these gussets. Here the two portions of the apparatus are seen in the semi-closed position. As can be seen, an end gusset 51 is attached as by welding to opposite ends of one segment of each of the side rails on the underside thereof, preferably along the outside edge thereof. This end gusset 51 is also attached to face plate 30—FIG. 7. The second segment of the two side rails each has an end gusset 50, spaced slightly inwardly from the outside edge of the side rail, such as to be spaced from gusset 51 when the two gussets are rotated to be in proximity as will be described. Gusset 50 is also spaced slightly inwardly attached to face plate 30. Each pair of gussets 51 and 50 are spaced slightly apart to avoid touching during rotational movement.

A pair of spaced outer central gussets 55 are mounted as by welding to both segments of central support 19 at the interior terminus of each segment at the outer edge of each side of one segment. A complimentary pair of inner central gussets 54 are mounted as by welding to the other segment of central support 19 at the interior terminus of each segment, spaced inwardly on the respective segment of the central support on which they are mounted. This provides clearance during rotational movement of both gussets 55 relative to both gussets 54.

While the outer gussets 51 and the outer of the two central gussets 55 are both shown mounted on the same segment of the device, they need not be so mounted. Either pair of end or central gussets may be mounted on either of the face plates 30,31. The gussets may be but need not be made equilateral. However, the side of each gusset that is attached to the face plate extends out beyond the face plate to permit all gussets to be connectable for rotation. It is to be noted that the preferred configuration for all of the gussets is a right-angle triangle, the 90-degree angle being at the intersection of the respective face plate with the central support segment.

A series of aligned bores 61 are placed, one in each of the aligned gussets 50, 51, 55, 54, 54, 55, to permit a pin 60 to be placed through each bore 61 and to extend slightly beyond the outer end gussets 50 to permit a cotter pin 65 to be placed through a counterbore 63 at each end of pin 60. Two cotter pins—best seen in FIGS. 7 & 10—prevent disassembly of the apparatus and yet permit easy disassembly for storage when needed upon their removal.

In the alternative, instead of using a rod with bores at each end and two cotter pins, one can utilize a pin 160 with a head 161 which pin is bored only at the end distant from the head. This bore is descripted 163, and requires the insertion of only one cotter pin 65 in said bore, which pin is shown adjacent to the pin, per FIG. 15.

The ability to separate the device into two section allows it to be stored in smaller areas such as a closet, by putting the two sections side by side. The ability to split the device, if desired, also allows the user to use only one section when for loading when another vehicle or a wall is in close approximation of the rear of the transport system, re truck or van.

In FIG. 3, the portions of the apparatus 10 are seen rotated toward a storage position. The upper portion as designated by side rail segment 12AV and the lower portion is designated by the reference 12BV on the side rail segment 12. The opposite side rail 11 is similarly designated as 11A and 11B, each with V and H components. The upper portion is closed off at the exterior end or what is designated the distal end by a reinforcement plate 28 which is welded or otherwise attached at the terminus of the underside of each side rail 12A, and the central support of that portion of the apparatus.

In accordance with FIGS. 3 and 8, a cover plate 23 having notched corners, per FIG. 11 overlies slightly onto central support 19, and the two horizontal sections of side rails; namely, 12AH and 11AH. A lower end plate 22 overlays vertically upon the distal terminus edge of the two side rails 12AH, 11AH, and part of the vertical component of the side rails as well as the distal terminus edge of the central support. The closed off elevation is equal to the elevation of the central support 19, which as stated is preferably a rectangular tube. The cover plate 23 is disposed arcuately at about a 45-degree angle downwardly form the highest point that is where the underside of plate 23 is resting on the central support. See FIG. 11. The upper surface of the cover plate 23 preferably carries spaced ridges to enhance traction. The underside of plate 23 and 22 are covered with felt or some other surface protecting non-scratching surface such as a Teflon® coating.

Also, seen in FIG. 3 is proximal end 10P of apparatus 10. Whereas the distal end 10D of the apparatus that rests on the truck bed has a ridged plate 23 that is disposed normal in part to the side rail termini, in contrast, the lower end plate 13 at the proximal end of the apparatus is angularly disposed. Thus it is seen that side rail 11AV is chamfered inwardly from top to bottom at about a 45-degree angle to yield a chamfered edge 18. The central support is also chamfered in like manner, as can be seen in FIG. 9. Lower end plate 13 is welded or otherwise attached to both the vertical and horizontal portions of the side rails 11A and 12A, as well as to the proximal edge of the central support, 19. A rib member 13R may be welded or otherwise attached to the underside of lower end plate 13 to ensure stability of the plate for loading and unloading when the apparatus is used in soft surfaces such as dirt or mud, cinders or sand.

In FIG. 6, the differences in the two portions of the first embodiment of the apparatus are readily seen by their designations 10U for upper and 10L for lower, which is the way they appear in the figure. Upper portion 10U is seen to have arcuate side rails while the lower part 10L has straight side rails. The presence of the angularly positioned lower end plate 13, permits the two internal edges of the respective portion, distal of 10L and proximal of 10U to interface smoothly as can be seen in FIG. 2 wherein the apparatus is expanded in contrast to the folded position of this figure.

In FIG. 9, the cover plate 23 and the end plate 22 are seen from the underside. Here the covering on both is rubber surface 25.

In FIG. 10, which is a close-up view, the interface of the two portions of the apparatus is seen as is one pair of end gussets 51 and 50. One end of pin 60 is seen protruding through aligned bores 61 with a cotter pin 66 disposed in pin bore 64, the transverse hole at each end of the pin. Note how the side rails portions, as well as the respective side rail portions not seen, about the face plate and are preferably welded thereto.

FIG. 11 is a close-up top perspective view of the mounted upper end plate 23. The notching of the corners attached to the side rails is readily seen. This notching is necessary due to the actual configuration of the side rails as seen in the front end view of FIG. 12. While we have referred previously to the side rails 12 and 11, each having a vertical component 11V and 12V and a horizontal component, 11H and 12H, the actual configuration of the side rails 11, 12 is not that of mirror image "L's," but rather but rather of mirror image stylized inverted "Square root symbols." Each extrusion 11, 12, comprises a generally vertical exterior segment 11VA, 12VA, a small horizontal top flat segment 11T, 12T, a downward inwardly descending segment 11VB, 12VB, and the horizontal intermediate segment 11H, 12H and an interior vertical parallel segment 11VF, 12VF. The remainders of these two extruded side rails are fully profiled in FIG. 16. This is readily seen from an inspection of FIGS. 8 and 11 wherein the cut edges of the side rails are seen as support for the edge view of FIG. 12.

In FIG. 14, the edges of the U-rungs 45 shown on the left side of the apparatus and the alternative steps 455 are seen on the right side of the apparatus in top view. Whereas in FIG. 13, the end elevational view, the placement of the U-rungs 45/steps 455 are seen. The discussion moves first to FIG. 13. The purpose of this figure is to indicate that the placement of the rungs/steps is set out in a path or configuration that matches the curvature of the apparatus. Each step or rung is slightly canted to best approximate the relative location along the arc of the apparatus to facilitate easy walking. The dual numbering was intentionally done, in view of the fact that from the vantage point of this view, it cannot be determined whether these elements are steps or rungs, and they can be either.

Reference is now made again to FIG. 14. Here U-rungs 45 are seen on the left and steps 455 on the right. The U-rungs may be formed by pre-bending a length of bar, rod or tube stock into a U-shaped and welding it into position; or 3 discrete pieces can be welded or otherwise attached end to end to form a U and then attached in place in successive pairs of bores. In the alternative, bar rod or tube stock can be extended through the side walls with two successive ends bent toward each other in the same plane, one rightwardly and one leftwardly and then joined to create a U-rung. Of course, other modes of forming the U-rungs are within the skill of the art and may be employed.

To form the steps, any of the modes just set forth can be used to make a U-rung, upon which a plate 454 of substantially the same size as the U-rung 45 is overlaid or even inset and then welded or otherwise attached in place over or within the U-rung to form a step 453. Of cource a solid plate could also be attached to the relevant sidewall without the formation of a U-rung to create a step 455. See FIG. 13 where such a step 455 is shown.

Obviously, the second embodiment would have both sides, 11 and 12 with the same element be they steps or U-rungs. The drawings this way is for the ease and convenience of the reader. In fact the offset as shown of the step/rung placement was also for the convenience of the reader to add clarity to the point illustrated. In all other aspects the apparatus 100 of this second embodiment is the same as apparatus 10 in that like numbers refer to like parts.

This view illustrates the arcuate nature of the apparatus which at the proximal end is resting at a lower level 70 and at its distal end at a higher level 71, approximating the elevation of a pickup truck or van bed. As is seen here too, each rung extends from side rail 12 to side rail 11, while resting on the top of, and preferably attached to the center support 19, as by welding or braising.

U-rungs 45 seen on the left side of the apparatus 100 are generally U-shaped oriented such that both arms are attached to the side rail, and the base of the U, parallel to the side rail. While these can be easily negotiated by a careful walker, the use of the steps 453 which are based on the rungs 45, but with a flat plate 454 overlaid or attached within the confines of the U is preferred for safety sake. Whether the plate is sized to fit within the confines of the U or over the rung, is a matter of design choice. Steps 453 and 455 are equally safe for the user.

In FIG. 15, a beaded pin 160 is seen. This pin 160 has a head 161, a shaft 162, and a single throughbore 163. Conventional cotter pin 65 is inserted through the throughbore 163 in the same manner as with the headless pin 60 seen in FIG. 10.

FIG. 16 is a composite view that compares the profile of the extruded side rail assembly of this invention with the side rail profile of other loading ramps. Prior unit profiles are the configuration defined by points JABCDEFGHJ which on reference to the figure yields a top pointed profile. The profile of the extrusion of this invention is JABDEFGHJ, bypassing point C. This yields a flattened safer profile. Again, reference is made to FIG. 16, and compare segments 11VA and 11VB to similarly designated segments in FIG. 12.

The flattened profile allows the device to be carried easier without fear of cuts or fatigue to the hands. This profile also significantly reduces possible cuts to motorcycle and bicycle tires, if a straight path is not taken up or down the ramp unintentionally.

For both embodiments of the apparatus, the use of aluminum alloy to support the weight of the motorcycle is preferred over all aluminum for strength, and over titanium due to cost factors. Steel though usable, could be unduly weighty for certain individuals. The addition of color as by paint, powder coating or anodization is within the scope of the invention.

While intended primarily for loading of cycles into trucks and vans, the apparatus can be used for raising the cycles from a lower lever to a higher level, such as for internal storage in a house or shed as may be desired. Thus the illustration shown in FIG. 14 where the distal end of the apparatus is resting on a porch or elevated level relative to the base which is situated on the ground, comes to mind.

By making the apparatus arcuate, a higher level of safety is achieved, as both the distal and proximate ends can rest on a flat surface when in use. One end at the upper level and one end at the lower level, an effect not achievable with a flat apparatus similar to a ladder.

From the point of view of terminology it is important to understand that a "rung" be it bar rod or tube stock, extends between two side walls. Whereas a U-rung is formed or mounted on the outside of a sidewall.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. An arcuate loading ramp for bicycles, motorcycles, and other two wheeled vehicles comprising two hinged together segments, a proximal portion, and a distal portion, each of which portions comprises a pair of spaced opposed side walls, each side wall having a vertical component and a horizontal component, the vertical component having a trapezoidal profile; a lower end plate to which is connected the proximal ends of the side walls of the proximal portion; and a reinforcement plate disposed at the distal end of the distal portion attached to the underside of the side walls; a center support having a first and second section, one section per segment, said center support being connected at its proximal end of the lower end plate, and connected at its distal end to the means at the distal end of the distal segment for offloading and having a series of spaced rungs mounted to each of the side walls, and which rungs rest on the center support; wherein, the profile of side walls comprises a vertical exterior segment, a horizontal top segment, an inwardly descending segment, a horizontal intermediate segment, and an interior vertical segment.

2. The apparatus of claim 1 wherein the spaced rungs are attached to the center support.

3. The apparatus of claim 1 wherein the hinged together portions are connected by a series of spaced bored gussets disposed on the respective portions, at the distal end of the proximal segment, and the proximal end of the distal portion, with a removable pin that passes through each of the bores of said gussets.

4. The apparatus of claim 3 wherein the gussets are triangular, and the removable pin is retained in place by a cotter pin.

5. The apparatus of claim 1 wherein the means for offloading comprises a vertical plate disposed between the side walls of the distal end of the distal segment, and a cover plate connected to the center support.

6. The apparatus of claim 2 wherein the spaced rungs are also attached to the horizontal component of each of the side walls.

7. The apparatus of claim 6 wherein the vertical component of the side walls is of a higher elevation than the rungs, and each rung is strained for better gripping.

8. The apparatus of claim 1 wherein the distal end of the proximal portion, and the proximal end of the distal portion are terminated by a fact plate that extends the elevation of the side wail, at least between the two side walls of each respective segment.

9. The apparatus of claim 1 wherein each face plate extends beyond the width of the respective portion, and below each side wall, and wherein a bored gusset is disposed beneath each side wall, of the respective portion, and the respective gusset is attached to the respective face plate of that portion.

10. An arcuate loading ramp for bicycles, motorcycles, and other two wheeled vehicles comprising two hinged together portions, a proximal portion and a distal portion, each of which portions comprise a pair of spaced opposed side walls, each side wall having a vertical component and a horizontal component, the vertical component having a trapezoidal profile; a lower end plate to which is connected the proximal ends of the side walls of the proximal segment; and means disposed at the distal end of the distal portion attached to the terminus of the underside of each side rail; a center support having first and second section, one second per portion, said center support being connected at its proximal end to the lower end plate, and connected at its distal end to the means at the distal end of the distal portion for offloading and having a series of spaced rungs mounted to the exterior surface of each of the side walls, and which rungs rest on the center support; wherein the interior vertical component of the side wall has a lower edge which is aligned with a lower edge of the center support, and the said vertical component of the side wall is joined to a flat upper edge of an elevation greater than the top of the center support; and wherein a bored gusset is disposed beneath each side wall at the distal end of the proximal portion and at the proximal end of the distal portion and a pin is disposed through the bores of all of said gussets.

11. The apparatus of claim 10 further including bored gussets disposed on the center support at the proximal end of the distal portion and distal end of the proximal portion, and the bores of the gussets mounted on the side walls are aligned with the bores of the side wall gussets.

12. The apparatus of claim 10 wherein the spaced rungs extend through the side wall mounted to permit a human foot to rest thereon.

13. The apparatus of claim 10 wherein each succeeding pair of spaced rungs, passes through the side wall on at least one of said side walls and each succeeding pair of spaced rungs are connected to each other to form a U-rung outside of said side wall.

14. An arcuate loading ramp for loading bicycles and motorcycles from the ground to a truck or other vehicle, which apparatus comprises two portions removably hinged together, each portion comprising a pair of spaced mirror image side walls, each of which side walls has an upper horizontal flat surface and intermediate horizontal surface space down from the upper horizontal surface, a center support equally spaced from each side wall and disposed parallel thereto; said side walls and said center support being connected by a series of transversely spaced rungs.

15. The apparatus of claim 14 wherein each side wall has an underside, and each portion, each side wall has a bored gusset on the underside thereof, through which bores passes a hinge pin.

16. The apparatus of claim 15 wherein each center support also has at bored gusset for receipt of said hinge pin.

17. The apparatus of claim 15 wherein on each portion, each rung passes through at least one of said side walls and the ends of each rung of such succeeding pair of rungs are connected together to form a U-rung landing for a foot.

18. The apparatus of claim 13 further including a plate attached on top of each U-rung to form a series of steps.

19. The apparatus of claim 17 further including a plate attached within each U-rung to form a series of steps.

20. The apparatus of claim 14 further including a series of plates attached to the exterior of each sidewall, in a spaced alignment with each rung disposed between the sidewalls.

* * * * *